United States Patent Office 3,173,769
Patented Mar. 16, 1965

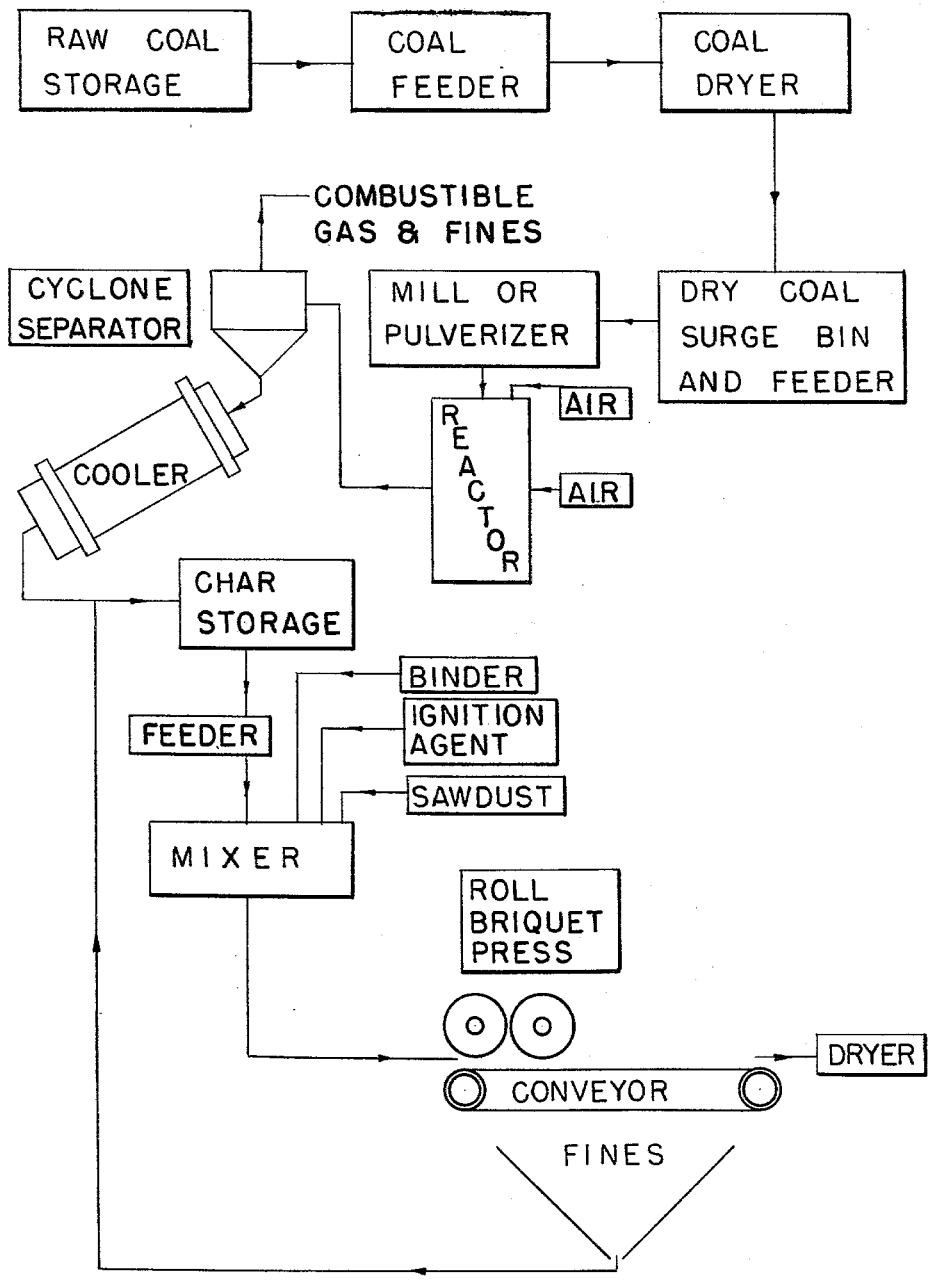

3,173,769
FUEL COMPOSITION
Samuel W. Martin, deceased, late of Oak Park, Ill., by Beverly Martin, executrix, Oak Park, Ill., and Frederick L. Shea, Jr., Arlington Heights, Ill., assignors to Great Lakes Carbon Corporation, New York, N.Y., a corporation of Delaware
Filed Dec. 22, 1961, Ser. No. 161,354
26 Claims. (Cl. 44—6)

This invention relates to improved, smokeless fuels and to a method for their manufacture. In a more particular, and preferred embodiment, this invention relates to the production of a fuel which is a suitable substitute for charcoal briquets or which may be used as fuel in the same manner as hardwood charcoal or hardwood charcoal briquets.

Charcoal has found wide utilization as a fuel for various purposes. It is an especially popular cooking fuel for broiling and similar cooking techniques which are practiced over open grills and the like. Charcoal or briquets made from charcoal and a binder such as starch have long been valued as a fuel due to the high temperatures which may be obtained merely by burning in air. Charcoal briquets are also valued as a fuel because the gases evolved during the burning have no objectionable odor.

Many attempts have been made to produce a substitute for this type of fuel using various types of cokes, semicokes, and coals. However, none of these have exhibited the desired burning characteristics of charcoal. In most instances, this is due to a lack of the necessary surface area which permits combustion to proceed without difficulty and with little draft in the open air.

The broad or primary object of this invention is to produce a formed fuel from coal or other suitable carbonaceous starting material which fuel is substantially smokeless upon burning and to provide a convenient, efficient, and economical method for accomplishing this.

A preferred object of this invention is to produce substantially smokeless fuel briquets, derived not from wood but from coal or a similar carbonaceous material, which briquets exhibit the desirable characteristics of hardwood charcoal briquets.

The foregoing broad or preferred objects are accomplished by mixing finely divided carbon, which has been pre-processed in a particular way, with water, a binder such as starch or other essentially non-smoking, non-bituminous organic binder, and in some cases also with an ignition agent, forming the mixture in a roll-type briquetting press, extrusion press, or other suitable equipment, and then drying the briquets or other formed articles.

The process of this invention, including a preferred way of producing the finely divided carbon, is detailed in the accompanying drawing.

In the most preferred embodiment, this invention comprises mixing finely divided carbon which has been pre-processed in a particular way to be described hereinafter, with sodium carbonate as an ignition agent, starch, and water, forming the mixture in a roll-type briquetting press and then drying the briquets.

The preferred binder is corn starch but other binders may be used such as potato starch, molasses, natural gums, dextrins, or other organic binders which are essentially non-smoking and free of odor during burning. If starch is to be used as a binder it may be either the pregelled type or a cooked solution of starch in water. Any of the organic binders listed in U.S. Patent 2,017,402 to G. Komarek and W. Chapman may be used as binders in our process with the exception of the secondary or bituminous binders described therein. The binder employed, such as starch, may also contain minor percentages such as 3–4% of borax or may be a blend of binders such as starch, water, and molasses.

The finely divided carbon or char employed as the raw material for the manufacture of our briquets according to this invention is preferably produced by a particular type of heat treatment of bituminous coal or other carbonaceous material capable of expanding on heating to plasticity, said method and apparatus for performing same being described in considerable detail in British Patent 786,207 or in U.S. Patent 2,868,695. Finely divided carbonaceous particles which are normally solid at ordinary temperatures and capable of becoming plastic and expanding on heating and having a volatile content from about 14% to about 45% are expanded by rapidly heating or flash-calcining them in the presence of air or other oxygen containing gas (or oxidizing gas), the oxygen being present only in such an amount that at least 10% of the evolved combustible volatile matter remains unburned. From about 2 to about 5 standard cubic feet of oxygen per pound of coal are used depending upon the volatile content of the carbonaceous particles to be flash-calcined, higher amounts of oxygen generally being required with the higher volatile materials. The reactor is maintained at a temperature above about 1150° F. or higher, and sufficient to ignite the particles, but below about 2000° F., and the particles, during a portion of the heating step which lasts about 3–30 seconds, heat up at a very rapid rate estimated to be in excess of about 2000° F. (particle surface temperature) per second. For example, and as determined optically by their change in color, their temperature may change from about 100° F. to about 1500° F. or more in only a small fraction of a second. The preferred reactor employed is a downward, linear flow, vertical reactor assuring minimum contact of the heated particles with the reactor walls. The solid expanded product is then separated in a second stage separator from the vaporous products at a temperature not less than that at which substantially all of said vaporous products remain in the vaporous state. This product, sometimes referred to in this specification as "char," typically has a bulk density of 6–20 pounds per cubic foot (preferably 9–12 lbs./cu. ft.), a particle size within the range of 5–1000 microns, and a volatile content of 3–18%. The examples illustrate in detail the preparation of this carbon product and many of the possible variables.

Agents may be added or incorporated in the char-binder mixtures to promote combustion and/or lower the ignition temperature of the formed and dried products, and such materials are referred to as ignition agents in the claims. (If employed they will typically range from about 1 to about 8 parts per 100 parts of char.) Such materials include the alkali carbonates, nitrates, chlorates, or chlorides, and the oxides of copper, lead, sodium (as sodium carbonate) or any other chemical listed as a combustion promoter or ignition accelerator, such as those appearing on pages 4, 6, 39, 40, 66, etc., in the 1937 Bureau of Mines Bulletin 404 entitled "Burning of Coal and Coke Treated With Small Quantities of Chemicals." Minor amounts of other materials such as lime and hickory sawdust may also be incorporated in the mixtures before they are formed and dried. Addition of lime improves the color of the ash as the ash produced during burning of the formed articles containing same is whiter than the ash produced from articles which do not contain lime. The hickory sawdust produces a pleasing aroma and meats cooked over articles containing this material have a slight hickory flavor. Blends of the processed carbonaceous particles of this invention with other combustible particles, such as charcoal, which blends are then mixed with binder, formed and dried, are also within the scope of this invention.

We have also found that the formed and dried articles or briquets may be coated with a water solution of starch to reduce the amount of fines on the surface so that the articles are cleaner to handle. This coating may be accomplished by spraying the solution on the articles or dipping the formed articles in the solution, and then drying at an elevated temperature.

The reason that our processed, finely divided carbon product or char may be used successfully as a raw material in manufacturing these formed and dried products or briquets is that due to the method of processing, the reactivity of the carbon is increased, probably because the surface area compared to that of the original raw material is greatly increased. Also, processing temperatures are sufficiently high so that the remaining volatile matter contributes no objectionable smoke or odor during burning of the finished article.

The bulk density of the char or carbon product used in making the formed and dried articles is quite low so that a reasonable amount of crushing may occur in the forming or briquetting process without yielding products with excessive densities. The process also provides good control of the volatile matter content of the product. Articles produced according to our invention are readily ignited and burn evenly and rapidly, particularly when they contain an ignition agent, without smoking or producing objectionable odors. The firmness and strength of our briquets also correspond approximately to that of charcoal briquets.

Among the advantages of our briquets over charcoal briquets is lower cost at an approximate equivalent heating value. (The typical heat value of our briquets is approximately 12,500 B.t.u. per pound and may vary from about 12,000 to about 13,500 B.t.u. per pound.) It is also possible to produce formed articles or briquets having different properties according to the desired end use of the formed product.

We have found that briquets made from starch (about 6 parts) and the herein specified processed finely divided carbon (100 parts) having a controlled low volatile content of about 3–7% can be ignited, even at high apparent densities, when used as a foundry fuel. The ignition temperature may be reduced by adding a small amount of sodium carbonate or other ignition agent. By using a carbon product having a higher volatile content (about 7–18%) and by using an alkali carbonate as an additive to reduce the ignition temperature, briquets can be obtained which approximate the ignitability and density of charcoal barbecue-type briquets.

The apparent density of the formed article or briquet, or the manner in which the forming is carried out and the success of same, also depend considerably on whether the char or processed particles are subjected to additional treatment such as milling or intensive mixing and fluxing with the additives prior to the forming or briquetting step.

Referring specifically to the case where the product is formed continuously by briquetting, and using normal binder levels such as from about 3 to about 10 parts per 100 parts of char, unless the char or expanded carbonaceous product is milled, or densified, either prior to the mixing with the other ingredients or during the mixing operation, a satisfactory operation cannot be achieved in the first pass through a roll-type briquet press. The non-densified cellular particles, when packed together in the briquetting press act like a rubber ball in that when the pressure is released, the compressed particles tend to cause the entire briquet to expand and to part into two or more pieces. This is due to the elastic properties of the expanded particles. Also, an approximate 3–10 fold volume reduction or density increase typically has to be effected in going from the char to the final briquet and this cannot all be brought about in a single pass through a roll-briquet machine which is limited, by its very construction, to volume reductions no greater generally than about two-fold. (The briquetting press employed was a double roll press with feeder. The rolls were each 22 inches in diameter with 8 inch faces and on each of the faces are 4 rows of oppositely paired pockets, 38 pockets in each row. These pockets are concave and define pillow-shaped briquets, 1¾" long, 1⅝" wide and 1 1/16" thick at their center, as the char mixture passes therebetween. Typical roll speeds are 10 revolutions per minute, powered by a 40 horsepower, 900 r.p.m., 220 volt, 60 cycle, open type motor.) Therefore, while the expanded char aggregate must have an initial bulk density within the range of 6 to 20 lbs./cu. ft. in order that the formed and dried products made from same have satisfactory burning properties, a satisfactory briquet cannot be made in a one-pass operation unless the char has a density (dry basis) of about 20 lbs./cu. ft. or is milled or otherwise "densified" to a general value at least this high or higher before the wet mix is fed to the briquetting press. Wet mix densities of about 30–40 lbs./cu. ft., using from about 40 to about 70 parts of water per 100 parts of char, at this point have been found to be operative. This enables a further compaction and densification in the briquetting machine to a typical apparent density of around 60–80 lbs./cu. ft. for the formed, undried briquets, so that after drying, the briquets have typical apparent densities between about 0.60 and 0.90 gram per cubic centimeter, although briquets of even lower density may be produced if the normal level of binder employed is increased.

Another factor which must be considered is the effect of the temperature of the mixture being fed to the briquetting machine. We generally prefer to mix the char with the binder, ignition agent, and water in a mix-muller because this machine not only brings about a thorough mixing of the briquet ingredients, but it also simultaneously brings about the desired and necessary milling and densification of the char product for the subsequent briquetting operation. The action of the mix-muller while the char, starch, ignition agent (if one is used), and water are being mixed for a time such as about 8–10 minutes, causes a substantial increase in the temperature of the mix which is to be fed to the briquet press. For example, the ejected mix may have a temperature of 120 to 130° F. when the ambient temperature is around 90° F. While some of the heat developed in the mix is due to the "heat of wetting" of the char by the water, most of it is due to the "working" of the mix by the mix-muller. The increase in temperature typically causes a significant drop in the viscosity and "adhesive quality" of the cooked starch binder or other type binder employed. Therefore, when the hot mix is fed to the briquet press and the starch's "adhesive properties" have been substantially reduced, the briquets which are ejected from the press tend to "clam shell" and will actually part into two or more pieces in the drier.

While the maximum allowable briquetting temperature has not been established it is preferred that the briquetting typically be carried out at around room temperatures and generally no higher than about 125–130° F. These lowered temperatures may be obtained in several ways, by cooling the mix, by cooling the mix-muller, or cooling the water which is fed to the mixer, etc.

In the case of forming by other techniques, such as by extruding or press-molding, pre-densification of the processed and expanded particles is not necessary because all of the desired densification can take place in the forming apparatus. It should however be appreciated that it may sometimes also be desirable to pre-densify the mix when using these forming techniques. In any case, at least some increase in density of the char product is effected in the forming step regardless of the forming apparatus employed, but in the case of briquetting, only a percentage (such as around 50%) of the total density increase can be effected in the forming step while with other techniques such as extrusion or press molding substantially all, or 100%, of the density increase can be effected in the forming step. This adaptation of the low density char to a continuous commerical briquetting operation and the discovery and control of the above conditions for successfully accomplishing this are among the important findings of this invention.

By controlling the volatile content and bulk density of our processed, finely divided raw material or char, and by proper control of subsequent milling, mixing and forming conditions, production of formed articles or briquets having widely varying properties is feasible. For example, a low-density product which will ignite quickly and burn rapidly can be produced which is very suitable for the home barbecue trade; or a higher density briquet or product can be produced which will burn more slowly and which is suitable for the restaurant trade or other applications where ease of ignition is of secondary importance.

In addition to the above suggested uses, the products of this invention may be used as a fuel to heat materials shipped in trucks and railroad cars during cold weather, to protect produce growers against frosts, for home fireplaces particularly when extruded in the shape of logs, etc.

The volatile content, bulk density and particle sizes of the carbonaceous materials described herein were determined by the following methods:

The "volatile content" of the starting carbonaceous material, for example raw bituminous coal, as well as the expanded or processed carbonaceous particles, is exclusive of water, and is determined by a procedure which is a modification of ASTM procedure #D271–48. A small sample of the starting material or of the expanded particles is heated to 950° C. for 5–10 minutes, the difference in weight between the sample and the final product being defined as "volatile content."

Bulk density values of the unmixed, expanded and processed carbonaceous particles and of the wet mix are determined by permitting the product to fall freely into a container of known volume. The weight of this known volume of material is then determined and the bulk density calculated.

As used in the application and claims, screen mesh sizes and the corresponding maximum size of particles passing therethrough are as follows.

| Screen mesh size: | Maximum size of particles passing therethrough in microns |
|---|---|
| 10 | 1,651 |
| 14 | 1,168 |
| 20 | 833 |
| 28 | 589 |
| 32 | 495 |
| 35 | 417 |
| 48 | 295 |
| 65 | 208 |
| 100 | 147 |
| 150 | 104 |
| 200 | 74 |
| 325 | 43 |
| 400 | 37 |

When it is stated in the specification or claims that the particles have a size within the range of about 5 to about 1,000 microns, this means that substantially all of the particles are of a size falling within this range, but that very minor amounts such as less than about 5% of the particles may fall outside the size range set forth.

The burning rates and some of the other combustion characteristics of the barbecue briquets of this invention, having the dimensions and configuration previously described in discussing the briquetting apparatus, were determined in an essentially draft-free room at ordinary temperatures (70–80° F.) by a single layer test method in which 16 whole briquets, which had been held at room temperature at least 8 hours prior to testing and which contained no more than 4% moisture, were arranged in a 4 x 4 single layer pattern in the center of the lower grate of a Weber No. SJ–100 Barbecue Grill, with their edges overlapping about one-eighth of an inch. This grill is approximately spherical in shape with a diameter of about 18 inches and the grate, which is a circular disc about 10 inches in diameter, is placed horizontally in the grill about 4 or 5 inches above its bottom. The disc had transverse parallel spacer rods about ⅛–³⁄₁₆″ wide and the open air spaces between the rods were ¾″ wide. The bottom of the grill had three ½ inch vent holes which could be adjusted to be fully open or fully closed and to draft positions in between. The grill was supported off the floor on a tripod. Although the grill had both a bottom and top hemisphere, only the bottom hemisphere was employed in the test, with the top being left off. Fifty milliliters of a naphthal lighter fluid having a flash point of 128° F. (Shell-Sol 72) or about 3 ml. per briquet, were then spread uniformly over the briquets, covering all edges first (about ¼″ from edge) with about half the fluid and then the top surfaces with the remaining portion, making sure that the outside edges and corners were adequately covered. The vent holes in the bottom of the grill were closed while the lighter fluid was applied to the briquets, care being taken to allow as little lighter fluid as possible to drip into the bottom of the grill. The briquets were ignited immediately by laying a paper towel on the briquets, lighting one edge and holding the ignited paper down with tongs until the lighter fluid ignited. A timer was started and the vent holes in the bottom of the grill were fully opened when the lighter fluid first ignited. With appropriate apparatus initial weights of the briquets and their weights after burning for 15 minutes, 30 minutes, and every 30 minutes thereafter until constant weight was reached, were taken and recorded. In this manner typical percent weight losses at 30 minutes (30 minute burning rate), times required to reach constant weight and percent weight losses after reaching constant weight for the briquets of this invention were determined.

The briquets also possess other characteristics which make them very suitable for barbecuing operations. They have ample crushing strengths (typically from about 65 to about 95 p.s.i.) so that they normally stay whole during bagging, shipping, and handling, etc. They also generally undergo only nominal surface abrasion loss during the above operations. (Test abrasion loss results typically involving more rigorous conditions than the above, generally vary from about 6.5 to about 8.5%) The relatively low apparent densities (0.60–0.90 g./cc. and preferably no higher than about 0.80 g./cc.) of the briquets means conversely that they possess a rather high volume to weight ratio, particularly for a non-wood derived product. This in turn permits or affords a rather large heating area per unit weight of the briquets so that more food or meat can be cooked at once over a wider area using the same weight of barbecue briquets than can be cooked over denser briquets.

The crushing strengths of the briquets were measured by placing them in a Dillon Dynamometer or Universal Tester, Model L, compressing them until they snapped apart and noting and recording the gage reading minus the zero reading. The briquets tested were held at room temperature at least 8 hours prior to testing and contained no more than 4% moisture.

Apparent densities and abrasion losses of the finished, dry briquets were determined according to tests adopted as standards by the International Briquetting Association at their regular meeting, August 19, 1957, Proceedings International Briquetting Association, University of Wyoming Natural Resources Research Institute, Information Circular No. 9 (December 1957).

In a preferred embodiment of the invention for making the expanded carbonaceous particles, bituminous coal is employed as a starting material and in a finely divided condition. By the term "finely divided" is meant a material which might typically be substantially 100% —48 mesh and at least about 50% —100 mesh and more preferably at least 75% —100 mesh and even finer such as 45 to 65% —325 and 90% or more —100 mesh. This starting material, which will also have a volatile content between about 14% and about 45% is typically entrained in an air stream and fed into the top of a downward, linear flow, vertical reactor in which reactor it undergoes a very rapid temperature change or flash-calcination. Additional air is typically supplied to the reactor at different points of the reactor to give a total oxygen content of between about 2.0 and about 5.0 standard cubic feet per pound of carbonaceous particles and to produce a maximum reactor temperature between about 1150° F. and 2000° F. and preferably between about 1350° F. and about 1600° F. The design of the system is such that most of the starting material particles flow downwardly or fall linearly through the reactor in a fairly direct vertical path, rather than circumferentially or tangentially around the walls thereof. Thus there is generally a minimum of contact of the main bulk of the particles with the reactor walls. Because of this minimum contact of the particles with the reactor walls, little abrasion of the expanded particles takes place and also little sticking of the particles to the reactor walls.

The residence time of the carbonaceous particles in the reactor can be closely controlled and the time selected is dependent upon a number of factors such as the sizes and volatile content of the particles, the reactor temperatures and dimensions, feed rates and gas stream pressures, and the ratio of oxygen to the carbonaceous particles. In a typical installation, the reactor, as schematically illustrated in the Shea U.S. Patent 2,868,695, will be cylindrically shaped with about a 2 foot long conical bottom portion, the cylinder portion typically having dimensions of 20 feet in length and an inside diameter of 5 feet. In such a case, a particularly useful residence time in the reactor is from about 3 to about 30 seconds; this corresponds to an average particle velocity of from about 7 to about 0.7 ft./second, it being understood that because of gas and air currents, etc., some minor percentage of particles may have residence times or velocities outside these ranges. In some cases, particularly with relatively coarse feeds or high volatile materials, it may be found desirable to employ auxiliary equipment such as mechanical or gas sweeping means to insure continuous passage of the particles through the reactor into the separator. The expanded solid product of this first stage is then separated from the gaseous products in a cyclone separator operated at a temperature not less than that at which substantially all of the vaporous products remain in the vaporous state.

In order to further illustrate the invention, but with no intention of being limited thereby, the following examples are set forth in which various types of solid carbonaceous materials with controlled moisture content were preliminarily ground to suitable particle size after which the comminuted material was processed in the manner indicated.

*Example 1*

A sample of Lillybrook No. 3 Mine Bituminous Coal having a volatile content of 17% and an ash content of 4.3% was milled to 75% —200 mesh. A reactor such as the reactor described above or in British Patent 786,207 was preheated to a temperature of 1410° F. A stream of the coal was entrained in air so that the oxygen to coal ratio was 3.0 cubic feet of oxygen to 1 pound of coal and was then fed into the reactor. The average particle velocity in the reactor was 1.5 ft./second. Secondary air was supplied to the reactor to produce a reactor temperature of 1562° F. The expanded solid product was then separated from the gaseous product in a cyclone collector operated at a temperature of not less than 810° F. so that the vaporous products remained in the vaporous state. The product had a volatile content of 8%, a bulk density of 15 lbs./cu. ft., and a particle size of 30% +150 mesh, 52% —200 mesh and 37% —325 mesh.

One hundred parts of the finely divided carbon product or char described above were mixed in a mix-muller with 5 parts of pre-gelled corn starch (dry), 2 parts of sodium carbonate (dry), and fifty parts of water. The mixture, after considerable densification of the product (wet mix bulk density of about 40 lbs./cu. ft.) which took place in the mixing operation, was briquetted in a roll-type briquetting press at room temperature. The briquets were then dried in a forced circulation Despatch Dryer at 260–275° F. for 3 hours so that the moisture content was reduced to 4–5%. The resulting briquet was strong, ignited readily, and burned rapidly and evenly without production of smoke or objectionable odors.

*Example 2*

A sample of Royalty Bituminous coal having a volatile content of 22% and an ash content of 2.5% was milled to 50% —325 mesh. The coal was then processed according to the procedure outlined in Example 1. The product had a volatile content of 13%, a bulk density of 10 lbs./cu. ft., and a particle size of 48% +150 mesh, 38% —200 mesh and 23% —325 mesh.

One hundred parts of the finely divided carbon product described above were mixed in a mix-muller with five parts of pre-gelled corn starch (dry), two parts of sodium carbonate (dry), and fifty parts of water. The mixture, after considerable densification of the product (wet mix bulk density of 33 lbs./cu. ft.) which took place in the mixing operation (and a particle size distribution change to 8% +150 mesh, 87% —200 mesh and 77% —325 mesh), was briquetted in a roll-type briquetting press at room temperature. The briquets were then dried in a Despatch Dryer at 260–275° F. for 3 hours so that the moisture content was reduced to 4–5%. The resulting briquet was strong, ignited readily, and burned rapidly and evenly without production of smoke or objectionable odors.

*Example 3*

Corn starch was cooked by heating 5 parts of starch (dry) in 52 parts of water to about 205° F. with 3% borax and the mixture was cooled. This corn starch solution was mixed in a mix-muller with 100 parts of the finely divided carbon product described in Example 1 and with 2 parts of sodium carbonate (dry). After considerable densification of the product, the mixture was briquetted in a roll-type briquetting press. The briquets were then dried in a Despatch Dryer at 260–275° F. for 3 hours so that the moisture content was reduced to 4–5%. The resulting briquet was strong, ignited readily, and burned rapidly and evenly without production of smoke or objectionable odors.

*Example 4*

A sample of Lillybrook No. 3 Mine Bituminous Coal having a volatile content of 17% and an ash content of 4.3% was milled to 75% —200 mesh. A reactor such as the reactor described above or in British Patent 786,207 was preheated to a temperature of 1410° F. A stream of the coal was entrained in air so that the oxygen to coal ratio was 3.0 to 1 and was then fed into the reactor. The average particle velocity in the reactor was 1.5 ft./second. Secondary air was supplied to the reactor to produce a reactor temperature of 1562° F. The expanded solid product was then separated from the gaseous products in a cyclone collector operated at a temperature of not less than 810° F. so that the vaporous products remained in the vaporous state. The separated particles were then conveyed into the top of a second vertical reactor such as also described in the British patent and secondary air was supplied to the second reactor to produce a temperature of 1960° F. to burn residual volatile matter remaining on the surfaces of the particles. The resulting product had a volatile content of 3%, a bulk density of 15 lbs./cu. ft., and a particle size of 16% +150 mesh, 71% —200 mesh and 46% —325 mesh.

Corn starch was cooked by heating 5 parts of starch (dry) in 52 parts of water to about 205° F. with 3% borax after which it was cooled. This corn starch solution was mixed in a mix-muller with 100 parts of the finely divided carbon product described above and, after considerable densification of the carbon product, the mixture was briquetted in a roll-type briquetting press. The briquets were then dried in a Despatch Dryer at 260–275° F. for 3 hours so that the moisture content was reduced to 4–5%. The resulting briquet was strong, and burned evenly without production of smoke or objectionable odors. This example illustrates the production of combustible formed and dried products from the special chars of this invention after the chars have been subjected to an additional heat treating step. Although such products will not have optimum burning characteristics for barbecue briquets, they nevertheless are satisfactory for use where slow, smokeless burning is desired, and are believed to be novel.

*Example 5*

The procedure of Example 3 was followed using the carbon product described in Example 1 except that the mixture of starch, carbon product, and sodium carbonate was extruded in an extrusion press at 80° F. instead of briquetted in a briquet press. Densification of the carbon product in the mix-muller took place during the mixing operation but such densification was optional and not essential prior to extruding. The solid fuel products were then dried according to the procedure outlined in Example 3. The resulting solid fuel was strong, ignited readily, and burned rapidly and evenly without production of smoke or objectionable odors.

*Example 6*

A sample of Williams coal having a volatile content of 34–36% was milled to 50% —325 mesh. A reactor such as the reactor described above or in British Patent 786,207 was preheated to a temperature of 1410° F. A stream of the coal was entrained in air and was then fed into and through the reactor. The average particle velocity in the reactor was about 1.5 ft./second. Additional air was supplied to the reactor at various levels to produce an average reactor temperature of about 1600° F. The total oxygen to coal ratio was about 5.0 standard cu. ft./lb. of coal particles. The expanded solid product was then separated from the gaseous product in a cyclone collector operated at a temperature of not less than 810° F. so that the vaporous products remained in the vaporous state. The product had a volatile content of 16.2%, a bulk density of 11.4 lbs./cu. ft., and a particle size of 24% +150 mesh, 62% —200 mesh and 35% —325 mesh.

One hundred parts of the finely divided carbon product described above were mixed for 10 minutes in a mix-muller with 6 parts of pre-gelled corn starch (dry) containing 3½% borax, 3 parts of sodium carbonate (dry), 1 part of lime, 6 parts of sawdust, 2½ parts of molasses (pre-mixed with 7–8 parts of water) and 35 additional parts of water. All parts were by weight. The bulk density of the densified char mixture was 35.0 lbs./cu. ft. The mixture was briquetted in a roll-type briquetting press at room temperature and possessed good green strength. The briquets were then dried to a moisture content of about 2%. The resulting briquets were strong, ignited readily, possessed a burning rate of 34.4–40.7% in 30 minutes, and had an average apparent density of 0.75 g./cc. The briquets burned evenly without production of smoke and had a weight loss of 92.2–92.8% in burning to constant weight within 180 minutes.

*Example 7*

Additional runs were made to produce a char product from the coal described in Example 1. In these runs the reactor temperature varied from 1550° F. to 1750° F., the feed size of the coal particles varied from 28 to 34% —325 mesh, 70 to 80% —200 mesh, 94 to 98% —100 mesh and 100% —60 mesh, and some tertiary and bottom air was admitted to the reactor besides the primary and secondary air. The bulk density of the char product varied between 10.6 and 14.0 lbs./ft.$^3$ and the volatile matter content between 8.4 and 12.6%. Typical particle size of the product was 50% +150 mesh, 40% —200 mesh, and 22% —325 mesh. These char products (100 parts) were then mixed for about 10 minutes in a mix-muller with from 5–8 parts of starch, from 45–65 parts of water and in some cases some soda ash, lime and sawdust. Bulk densities after mixing varied from 31.6 to 40.0 lbs./cu. ft. Dried briquets formed from these mixtures having an ignition agent possessed burning rates of 20–30% weight loss in 30 minutes, lost from 85–90% of their weight on burning to constant weight, required about 225 minutes to burn to constant weight, had apparent densities around 0.75–0.76 g./cc., moisture content around 1.2%, crushing strengths of 80–85 lbs./square inch and abrasion losses between 7.1 and 7.8%.

*Example 8*

Additional runs were made to produce a char product from the type coal described in Example 2. In these runs the reactor temperature varied from 1480° F. to 1800° F., the feed size of the particles from 32% to 65% —325 mesh, 80 to 90% —200 mesh, and 97 to 100% —100 mesh, and some tertiary and bottom air was admitted to the reactor besides the primary and secondary air. The bulk density of the char product varied between 8.5 and 14.0 lbs./ft.$^3$ and the volatile matter content between 8.4 and 12.6%. Typical particle size of the product was 40% +150 mesh, 49% —200 mesh, and 29% —325 mesh. These char products (100 parts) were then mixed for about 12 minutes in a mix-muller with from 5 to 8 parts of starch, from 40 to 60 parts of water and in some cases some soda ash, lime and sawdust. Bulk densities after mixing varied from 29 to 38 lbs./cu. ft. Dried briquets formed from these mixtures having an ignition agent possessed burning rates of 19 to 34% weight loss in 30 minutes, lost from 92 to 95% of their weight on burning to constant weight, required about 210 minutes to burn to constant weight, had apparent densities around 0.69 to 0.77 g./cc., moisture content around 0.8 to 2.3%, crushing strengths of 65 to 91 lbs./square inch, and abrasion losses between 6.5 and 8.5%.

*Example 9*

Additional runs were made to produce a char product from the type coal described in Example 6. In these runs the reactor temperature varied from 1570° F. to 1620° F., the feed size of the particles from 50 to 57.5% —325 mesh, 80 to 90% —200 mesh and 100% —100 mesh. Tertiary and bottom air was admitted to the reactor besides primary and secondary air. The bulk density of the char product varied between 12.8 and 13.2 lbs./ft.$^3$ and the volatile matter content between 9.3 and 9.7%. Typical particle size distribution of the product was the same as with the product of Example 6. These char products (100 parts) were then mixed for about 6 minutes in a mix-muller with from 6 parts of starch, from 40 to 60 parts of water, 3½ parts of soda ash, 1 part of lime and 2½ parts of molasses. Bulk densities after mixing varied from 23.5 to 40.0 lbs./cu. ft. Dried briquets formed from these mixtures possessed burning rates of 30.6 to 31.7% weight loss in 30 minutes, lost about 90% of their weight on burning to constant weight, required about 210 to 225 minutes to burn to constant weight, had apparent densities around 0.80 g./cc., moisture content around 1.7%, crushing strengths of about 85 lbs./sq. in., and abrasion losses of around 7.3%.

The foregoing examples illustrate the preparation of the novel briquets of this invention from several different types of coal starting materials having widely varying volatile contents. We have found that the volatile content of the carbonaceous starting material may be from about 14% to about 45%, ranging through the low volatile, mid volatile and high volatile bituminous coals such as Lillybrook, Slab Fork, Red Indian, Royalty, Williams and Omar, etc. The raw material employed may be any of the above types or any finely divided carbonaceous material which is normally solid at ordinary temperatures and capable of expanding on heating to plasticity. By the latter is meant the ability of the material to soften when heated through the plastic state and swell if the volatile matter of each particle is driven off at a sufficiently high or rapid rate. Other examples of such materials include impsonite and albertite, high volatile (such as around 25%) petroleum coke, raw coal tar pitch coke, and coal tar pitch fortified with any of the various thermal blacks or carbon blacks. In any event the processing history of the raw material selected must not include any heating at a temperature high enough to result in a permanently "set" carbonaceous structure. Any raw material subjected to such temperature will not expand satisfactorily on heating to plasticity under the conditions disclosed herein.

In preparing the carbonaceous material described previously herein (which for convenience in the drawing is designated as raw coal) for the first stage rapid heating and flash-calcination operation, the material must generally be suitably ground or milled to produce finely divided particles, although it is contemplated that in some cases the starting materials may already be in this condition or that some sub-dividing of the particles may take place in the first stage reactor. This involves the use of a hammer mill, or other appropriate commercial coal pulverizing apparatus. Finely divided particles of many feed sizes, such as 100% −48 mesh are operative particularly when large reactors are employed or when auxiliary means are employed to prevent the particles from building up in the reactor or elsewhere. We prefer to use particles which are at least about 75% −100 mesh and preferably about 90 to 100% −100 mesh and 75 to 95% −200 mesh, in order to have maximum air to coal contact and to activate and expand as high as percentage of the coal as possible and to produce particles of the proper surface area and size (substantially all within the range of 5 to 1000 microns) and having the desired bulk density (6 to 20 lbs/cu. ft.). These all have a bearing on the combustion characteristics of the final formed products. They also affect the ease and manner in which the particles are mixed with the binder, etc., and are formed or briquetted.

In preparing the expanded carbonaceous particles by the process described herein, particularly beneficial results are obtained by maintaining the moisture content of the raw material at a value of less than 5% by weight. Excess moisture in the carbonaceous or bituminous material fed to the reactor or unit in which the flash-calcination is conducted necessitates vaporization of the water to a temperature above 1150° F., or whatever reactor temperature is used, which sharply reduces the rate of temperature rise of the carbonaceous particles. Often this must be done by burning additional fuel in the unit since excess moisture in the particles reduces the temperature of the operation to a point where the desired results are not obtained. It has also been observed that, in general, higher temperatures may be tolerated when larger particle feed sizes are used.

Control of the temperature of heat treatment in the flash-calcination reactor is accomplished primarily by regulating the air or oxygen intake, although the volatile matter content of the starting material and the amount of fuel gas, if any, employed also have influence upon the temperature. The amount of air or oxygen present should be sufficient to make the process self-sustaining, while permitting expansion of the individual carbonaceous or bituminous particles at a rapid rate, but its amount should be insufficient to permit more than a minimum burning of the individual expanded or cellular product particles. The oxygen or air employed may of course enter the reactor in partial amounts, such as some entrained with the finely divided particles fed into the top of the reactor, some at different inlets along the reactor such as about 4 and/or 8 feet from the top of a 20 foot reactor, and also some as a gas stream near the reactor conical bottom to prevent the expanded particles from accumulating in the reactor or at its exit. Typically the percentages of the total oxygen which are employed at the top and bottom of the reactor will be much higher than elsewhere in the reactor.

Use of too low a temperature in the first stage reactor will result in an insufficiently expanded product. Use of too high a temperature will result in too low a volatile content of the char product, undue shrinkage or collapse of the particles and a consequent excessively high bulk density of the product. In either case the bulk density of the product will be excessive and the desired surface area increase in the particles, which is important in order to achieve formed products having good burning characteristics such as are desired for barbecue briquets, is not achieved.

Other means for producing high surface area, expanded carbonaceous particles of low bulk density out of suitable expandable, starting carbonaceous raw materials may also be resorted to, although the process described in the present application is much preferred, and this invention contemplates, therefore, the making of formed and dried products out of same using the binder systems and processing techniques described herein, the production of such bodies and techniques therefor being considered new with this invention.

It should be pointed out that the combustion characteristics of any material depend considerably on a number of factors such as the sizing of the material, the amount and force of air that comes in contact with it, the number of layers of the material, whether a lighter fluid is employed and if so how and where and how much, etc. We believe that the products described and claimed in this application are new with this invention and that we are the first to make such products having the combustion characteristics described herein. These characteristics are:

A. *Easily ignited.*—Require little heat or relatively low temperatures to ignite and after ignition continue to burn readily because of the high internal heats which develop. A single briquet can typically be ignited with a match.

B. *Rapid burning rates.*—Thirty minute burning rates, as defined and measured herein, of our briquets made from char, binder and ignition agent, are from 15 to 40 percent with rates of 30% or higher as typical. Complete burning of the briquets typically takes place within about 150 to 240 minutes.

C. *Even burning.*—Burn relatively evenly and smoothly over an extended period of time; in other words, not with a huge flame and intense heat for a few minutes and then very slowly with little heat for a long period; because of this even burning they are eminently suitable for barbecuing where heats which scorch are undesirable but where heats of rather high intensity maintained rather steadily for 0 to 3–4 hours are often desired.

D. *Smokeless.*—Because of the method of processing, the char and the formed products have little or no undesirable volatiles which cause smoke or other undesirable products upon burning. The binder selected also avoids this; and any ignition agent which is used is one which can be safely used in this setting, does not deleteriously affect the evenness of burning or the avoidance of undesirable products upon burning, depending upon the end use of the formed products.

This application is a continuation-in-part of our previous application, Serial No. 791,670, filed February 6, 1959, abandoned December 22, 1961, for "Fuel Composition."

It is to be understood that the invention is not limited to the specific examples which have been offered merely as illustrative and that modifications may be made within the scope of the appended claims without departing from the spirit of the invention.

We claim:

1. A process for preparing a non-smoking solid fuel from finely divided carbonaceous particles having a volatile conent from about 14% to about 45%, and which are normally solid at ordinary temperatures and capable of becoming plastic and expanding on heating, which comprises:

flash-calcining the particles at a temperature from about 1150° to about 2000° F. in a gas stream containing oxygen in an amount such that at least 10% of the evolved combustible volatile matter remains unburned;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water and an essentially non-smoking, non-bituminous organic binder;

and forming and drying said mixture.

2. A process for preparing a non-smoking solid fuel from finely divided carbonaceous particles having a volatile content from about 14% to about 45%, and which are normally solid at ordinary temperatures and capable of becoming plastic and expanding on heating, which comprises:

flash-calcining the particles at a temperature from about 1150° to about 2000° F. in a gas stream containing oxygen in an amount such that at least 10% of the evolved combustible volatile matter remains unburned;

separating the loose solid expanded product from gaseous and vaporous products at a temperature not less than that at which substantially all of said vaporous products remain in the vaporous state, said loose product having a bulk density in the range of about 6 to 20 lbs./cu. ft, a volatile content of about 3 to about 18%, and a particle size within the range of about 5 to 1000 microns;

mixing said product with water, an ignition agent, and an essentially non-smoking, non-bituminous organic binder;

and forming and drying said mixture.

3. A process according to claim 2 wherein the ignition agent is selected from the group consisting of alkali carbonates, nitrates, chlorates and chlorides, and oxides of copper, lead and sodium and mixtures thereof.

4. A process according to claim 1 wherein said loose product is densified, either before or during said mixing step so that its bulk density is substantially increased, and then said densified product is formed and dried.

5. A process for preparing a non-smoking solid fuel from finely divided carbonaceous particles having a volatile content from about 14% to about 45%, and which are normally solid at ordinary temperatures and capable of becoming plastic and expanding on heating, which comprises:

heating the particles for a time of from about 3 to about 30 seconds in a downward, linear flow, vertical reactor while the particles are moving at a particle velocity of from about 7 to about 0.7 ft./second through the reactor maintained at a temperature from about 1150° to about 2000° F. in a gas stream containing oxygen in an amount between about 2.0 and about 5.0 standard cu. ft./lb. of carbonaceous particles so that at least 10% of the evolved combustible volatile matter remains unburned, the particles being flash-calcined at an upheat rate in exces of about 2000° F. per second;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water and an essentially non-smoking, non-bituminous organic binder;

and forming and drying said mixture.

6. A process for preparing a non-smoking solid fuel from finely divided carbonaceous particles having a volatile content from about 14% to about 45%, and which are normally solid at ordinary temperatures and capable of becoming plastic and expanding on heating, which comprises:

heating the particles for a time of from about 3 to about 30 seconds in a downward, linear flow, vertical reactor while the particles are moving at a particle velocity of from about 7 to about 0.7 ft./second through the reactor maintained at a temperature from about 1150° to about 2000° F. in a gas stream containing oxygen in an amount between about 2.0 and about 5.0 standard cubic ft./lb. of carbonaceous particles so that at least 10% of the evolved combustible volatile matter remains unburned, the particles being flash-calcined at an upheat rate in excess of about 2000° F. per second;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water, an ignition agent and an essentially non-smoking, non-bituminous organic binder;

and forming and drying said mixture.

7. A process according to claim 5 wherein the starting, finely divided carbonaceous particles which are to be heat treated have a particle size of at least 75% −100 mesh.

8. A process according to claim 6 wherein the starting, finely divided carbonaceous particles which are to be heat treated have a particle size of at least 75% −100 mesh and wherein the ignition agent is selected from the group consisting of alkali carbonates, nitrates, chlorates and chlorides, and oxides of copper, lead and sodium and mixtures thereof.

9. A process for preparing a non-smoking solid fuel in briquet form from finely divided carbonaceous particles having a particle size of at least about 75% −100 mesh, a volatile content from about 14% to about 45%, and which are normally solid at ordinary temperatures and capable of becoming plastic and expanding on heating, which comprises:

heating the particles for a time of from about 3 to about 30 seconds in a downward, linear flow, vertical reactor while the particles are moving at a particle velocity of from about 7 to about 0.7 ft./second through the reactor maintained at a temperature from about 1150° to about 2000° F. in a gas stream containing oxygen in an amount between about 2.0 and about 5.0 standard cu. ft./lb. of carbonaceous particles so that at least 10% of the evolved combustible volatile matter remains unburned, the particles being flash-calcined at a rate in excess of 2000° F. per second;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water and an essentially non-smoking, non-bituminous organic binder;

densifying said loose product either before or during said mixing step so that its bulk density is substantially increased;

roll briquetting said densified mixture at a temperature no higher than about 130° F.; and drying the resulting briquets.

10. A process for preparing a non-smoking solid fuel in briquet form from finely divided carbonaceous particles having a particle size of at least about 75% —100 mesh, a volatile content from about 14% to about 45%, and which are normally solid at ordinary temperatures and capable of becoming plastic and expanding on heating, which comprises:

heating the particles for a time of from about 3 to about 30 seconds in a downward, linear flow, vertical reactor while the particles are moving at a particle velocity of from about 7 to about 0.7 ft./second through the reactor maintained at a temperature from about 1150° to about 2000° F. in a gas stream containing oxygen in an amount between about 2.0 and about 5.0 standard cubic ft./lb. of carbonaceous particles so that at least 10% of the evolved combustible volatile matter remains unburned, the particles being flash-calcined at a rate in excess of 2000° F. per second;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water, an ignition agent, and an essentially non-smoking, non-bituminous organic binder;

densifying said loose product either before or during said mixing step so that its bulk density is substantially increased;

roll briquetting said densified mixture at a temperature no higher than about 130° F.; and drying the resulting briquets.

11. A process according to claim 10 wherein the ignition agent is selected from the group consisting of alkali carbonates, nitrates, chlorates and chlorides, and oxides of copper, lead and sodium and mixtures thereof.

12. A process according to claim 9 wherein the binder is corn starch.

13. A process according to claim 10 wherein the binder is corn starch and wherein the ignition agent is sodium carbonate.

14. A process according to claim 9 wherein the dried briquets are coated with a water solution of starch and the coated briquets are then dried.

15. A non-smoking solid fuel comprising a consolidated mixture of expanded, finely divided carbon and an essentially non-smoking, non-bituminous, organic binder;

said expanded, finely divided carbon having an as-produced bulk density in the range of about 6 to 20 lbs./cu. ft., a volatile content of about 3 to about 18%, and a particle size within the range of about 5 to 1000 microns; said expanded, finely divided carbon also being produced from the flash-calcination and heating of carbonaceous particles at a temperature between about 1150° to about 2000° F. in a gas stream containing oxygen in an amount between about 2.0 and about 5.0 standard cubic ft./lb. of carbonaceous particles;

said carbonaceous particles having a volatile content from about 14% to about 45% and being normally solid at ordinary temperatures and capable of becoming plastic and expanding on heating.

16. A non-smoking solid fuel comprising a consolidated mixture of expanded, finely divided carbon, an essentially non-smoking, non-bituminous, organic binder and an ignition agent;

said expanded, finely divided carbon having an as-produced bulk density in the range of about 6 to 20 lbs./cu. ft., a volatile content of about 3 to about 18%, and a particle size within the range of about 5 to 1000 microns;

said expanded finely divided carbon also being produced from the flash-calcination and heating of carbonaceous particles at a reactor temperature between about 1150° to about 2000° F. in a gas stream containing oxygen in an amount between about 2.0 and about 5.0 standard cubic ft./lb. of carbonaceous particles;

said carbonaceous particles having a volatile content from about 14% to about 45% and being normally solid at ordinary temperatures and capable of becoming plastic and expanding on heating.

17. A non-smoking, solid fuel, which possesses a good burning rate and which does not give off objectionable odors upon burning, comprising a formed and dried mixture of expanded finely divided carbon, an ignition agent selected from the group consisting of alkali carbonates, nitrates, chlorates and chlorides, and oxides of copper, lead and sodium and mixtures thereof, and a non-smoking, non-bituminous, organic binder;

said expanded finely divided carbon having an as-produced bulk density in the range of about 6 to about 20 lbs./cu. ft., a volatile content of about 3 to about 18%, and a particle size within the range of about 5 to 1000 microns;

said expanded finely divided carbon also being produced from the flash-calcination and heating of starting carbonaceous particles at a reactor temperature between about 1150° to about 2000° F. in a gas stream containing oxygen in an amount between about 2.0 and about 5.0 standard cu. ft./lb. of carbonaceous particles; and said starting carbonacous particles having a volatile content from about 14% to about 45% and being normally solid at ordinary temperatures and capable of becoming plastic and expanding on heating.

18. A non-smoking solid fuel according to claim 16 when comprised of 100 parts of said expanded, finely divided carbon, from about 1 to about 8 parts of said ignition agent and about 3 to about 10 parts of said binder.

19. A non-smoking solid fuel according to claim 17 wherein the binder is corn starch and wherein the ignition agent is sodium carbonate.

20. A non-smoking, solid fuel, which does not give off objectionable odors upon burning, and which when formed into briquets in the form, manner, and size described herein, possesses an apparent density between about 0.6 and 0.90 g./cc. and a 30 minute burning rate between about 15% and about 40%, comprising a formed and dried mixture of expanded finely divided carbon, starch and sodium carbonate;

said expanded finely divided carbon having an as-produced bulk density in the range of about 6 to 20 lbs./cu. ft., a volatile content of about 3 to about 18%, and a particle size within the range of about 5 to 1000 microns;

said expanded finely divided carbon also being produced from the flash-calcination and heating of starting bituminous coal particles at a reactor temperature between about 1150° F. to about 2000° F. in a gas stream containing oxygen in an amount between about 2.0 and about 5.0 standard cu. ft./lb. of carbonaceous particles; and said starting bituminous coal particles having a volatile content ranging through those encountered in conventional low, medium and high volatile coals and being normally solid at ordinary temperatures and capable of becoming plastic and expanding on heating.

21. A process for preparing a non-smoking solid fuel from finely divided bituminous coal particles being normally solid at ordinary temperatures and capable of becoming plastic and expanding on heating and having a volatile content such as encountered in a conventional low volatile coal, which comprises:

flash-calcining the particles at a temperature from about 1150° to about 2000° F. in a gas stream containing oxygen in an amount such that at least 10% of the evolved combustible volatile matter remains unburned;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water and an essentially non-smoking, non-bituminous organic binder;

and forming and drying said mixture.

22. A process for preparing a non-smoking solid fuel from finely divided bituminous coal particles being normally solid at ordinary temperatures and capable of becoming plastic and expanding on heating and having a volatile content such as encountered in a conventional medium volatile coal, which comprises:

flash-calcining the particles at a temperature from about 1150° to about 2000° F. in a gas stream containing oxygen in an amount such that at least 10% of the evolved combustible volatile matter remains unburned;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water and an essentially non-smoking, non-bituminous organic binder;

and forming and drying said mixture.

23. A process for preparing a non-smoking solid fuel from finely divided bituminous coal particles being normally solid at ordinary temperatures and capable of becoming plastic and expanding on heating and having a volatile content such as encountered in a conventional high volatile coal, which comprises:

flash-calcining the particles at a temperature from about 1150° to about 2000° F. in a gas stream containing oxygen in an amount such that at least 10% of the evolved combustible volatile matter remains unburned;

separating the loose solid expanded product from gaseous and vaporous products at a temperature not less than that at which substantially all of said vaporous products remain in the vaporous state, said loose product having a bulk density in the range of about 6 to 20 lbs./cu. ft., a volatile content of about 3 to about 18%, and a particle size within the range of about 5 to 1000 microns;

mixing said product with water and an essentially non-smoking, non-bituminous organic binder;

and forming and drying said mixture.

24. A non-smoking, solid fuel, which does not give off objectionable odors upon burning, and which when formed into briquets in the form, manner and size described herein, possesses an apparent density between about 0.6 and 0.90 g./cc. and a 30 minute burning rate between about 15% and about 40%, comprising a formed and dried mixture of expanded finely divided carbon, starch and sodium carbonate;

said expanded finely divided carbon having an as-produced bulk density in the range of about 6 to 20 lbs./cu. ft., a volatile content of about 3 to about 18%, and a particle size within the range of about 5 to 1000 microns;

said expanded finely divided carbon also being produced from the flash-calcination and heating of starting bituminous coal particles at a reactor temperature between about 1150° F. to about 2000° F. in a gas stream containing oxygen in an amount between about 2.0 and about 5.0 standard cu. ft./lb. of carbonaceous particles; and said starting bituminous coal particles having a volatile content such as encountered in a conventional low volatile coal and being normally solid at ordinary temperatures and capable of becoming plastic and expanding on heating.

25. A non-smoking, solid fuel which does not give off objectionable odors upon burning, and which when formed into briquets in the form, manner and size described herein, possesses an apparent density between about 0.6 and 0.90 g./cc. and a 30 minute burning rate between about 15% and about 40%, comprising a formed and dried mixture of expanded finely divided carbon, starch and sodium carbonate;

said expanded finely divided carbon having an as-produced bulk density in the range of about 6 to 20 lbs./cu. ft., a volatile content of about 3 to about 18%, and a particle size within the range of about 5 to 1000 microns;

said expanded finely divided carbon also being produced from the flash-calcination and heating of starting bituminous coal particles at a reactor temperature between about 1150° F. to about 2000° F. in a gas stream containing oxygen in an amount between about 2.0 and about 5.0 standard cu. ft./lb. of carbonaceous particles; and said starting bituminous coal particles having a volatile content such as encountered in a conventional medium volatile coal and being normally solid at ordinary temperatures and capable of becoming plastic and expanding on heating.

26. A non-smoking, solid fuel, which does not give off objectionable odors upon burning, and which when formed into briquets in the form, manner, and size described herein, possesses an apparent density between about 0.6 and 0.90 g./cc. and a 30 minute burning rate between about 15% and about 40%, comprising a formed and dried mixture of expanded finely divided carbon, starch and sodium carbonate;

said expanded finely divided carbon having an as-produced bulk density in the range of about 6 to 20 lbs./cu. ft., a volatile content of about 3 to about 18%, and a particle size within the range of about 5 to 1000 microns;

said expanded finely divided carbon also being produced from the flash-calcination and heating of starting bituminous coal particles at a reactor temperature between about 1150° F. to about 2000° F. in a gas stream containing oxygen in an amount between about 2.0 and about 5.0 standard cubic ft./lb. of carbonaceous particles; and said starting bituminous coal particles having a volatile content such as encountered in a conventional high volatile coal and being normally solid at ordinary temperatures and capable of becoming plastic and expanding on heating.

References Cited in the file of this patent

UNITED STATES PATENTS

| | | |
|---|---|---|
| 1,752,838 | Crossman | Apr. 1, 1930 |
| 2,160,442 | Piou et al. | May 30, 1939 |
| 2,349,342 | Erickson | May 23, 1944 |
| 2,706,706 | Pettyjohn | Apr. 19, 1955 |
| 2,868,695 | Shea | Jan. 13, 1959 |

FOREIGN PATENTS

| | | |
|---|---|---|
| 494,770 | Great Britain | Nov. 1, 1938 |
| 744,745 | Great Britain | Feb. 15, 1956 |